Feb. 22, 1938. F. H. SCHNEIDER Re. 20,662

GAS BURNER

Original Filed May 31, 1934

INVENTOR
Frank H. Schneider
BY
Herbert S. Fairbanks
ATTORNEY

Reissued Feb. 22, 1938 Re. 20,662

UNITED STATES PATENT OFFICE 20,662

GAS BURNER

Frank H. Schneider, Royersford, Pa., assignor to The Floyd-Wells Company, Royersford, Pa., a corporation of Pennsylvania Original No. 2,040,446, dated May 12, 1936, Serial No. 728,198, May 31, 1934. Application for reissue December 24, 1937, Serial No. 181,706

3 Claims. (Cl. 158—116)

One object of my present invention is to devise a novel gas burner in which the burner ports will not become clogged due to the arrangement of the ports and the provision of a novel spill-over ring which latter also carries the supporting grid for the cooking utensil.

The spill-over ring is in the form of an apertured disc preferably of cast iron and acting as a heat radiating member and also as a spill over.

The outside ports are circumferentially arranged in the side wall of the burner and extend laterally while the inside ports are inclined upwardly and are ignited by the flame from the laterally extending burner ports, by means of the spill-over ring which directs the gases from inside unlit ports to outside lit ports.

The spill-over member can be cast integrally with the burner or bolted to it in spaced relationship.

With the above and other objects in view as will hereinafter fully appear, my invention comprehends a novel gas burner which will be a safe burner as the burner ports cannot be clogged from food or articles being cooked spilling over the burner.

It further comprehends a novel gas burner in which the combustible fuel is introduced into a chamber leading to the burner ports.

It further comprehends a novel burner having outer laterally extending ports and upwardly inclined inner ports above which a novel spill over member is provided which will direct the spilled material away from the ports and thus prevent their clogging.

It further comprehends a novel gas burner in which the utensil supporting grid is carried by a spill-over member carried by and spaced from the body portion of the burner.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Similar numerals of reference indicate corresponding parts.

Referring to the drawing:—

Figure 1:
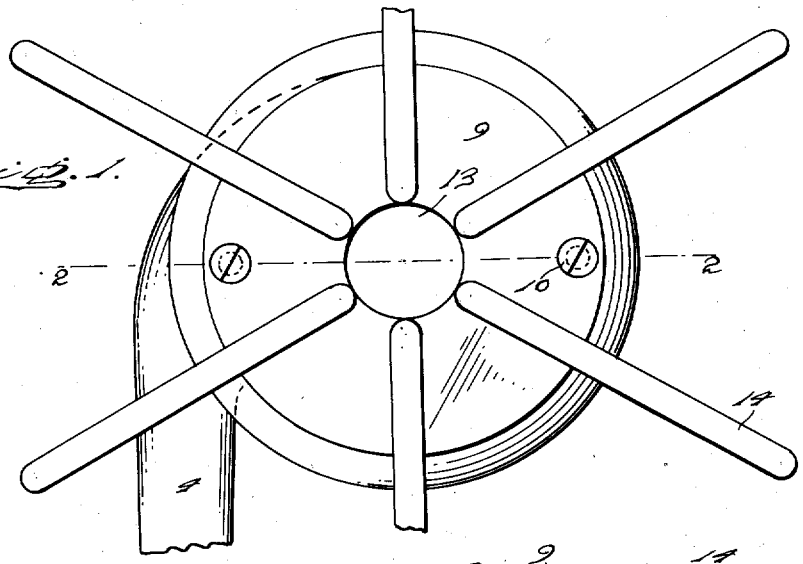
Figure 1 is a top plan view of a gas burner embodying my invention.
Figure 2:
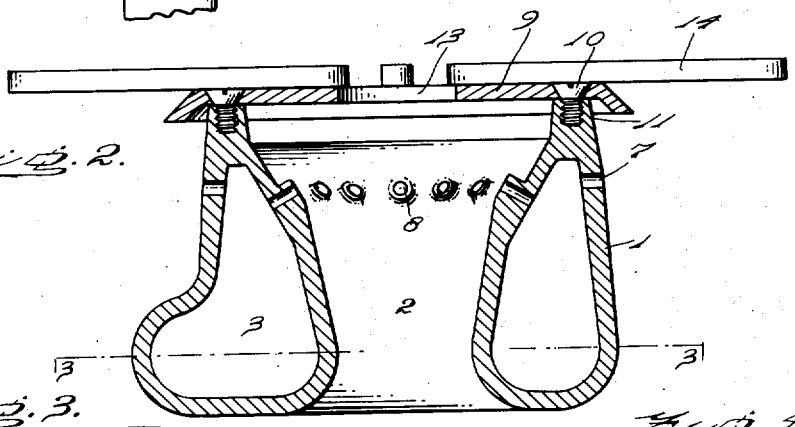
Figure 2 is a section on line 2—2 of Figure 1.
Figure 3:
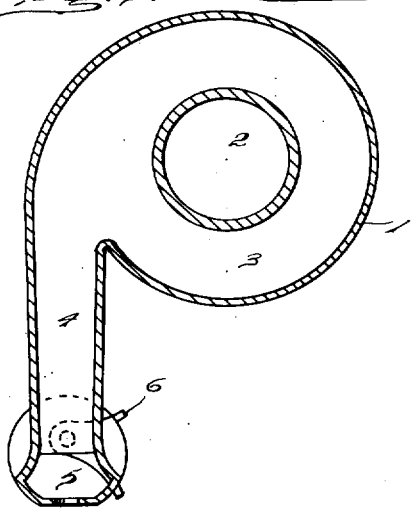
Figure 3 is a section on line 3—3 of Figure 2.
Figure 4:
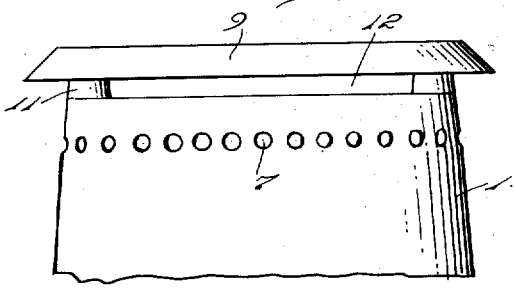
Figure 4 is a side elevation of the burner.

1 designates the body portion or the casing of a gas burner embodying my invention. The body portion is provided with a central bore 2 extending vertically through it and with a chamber 3 into which the fuel is tangentially introduced through the fuel inlet 4. The fuel inlet at its inlet end is provided with an air opening 5 controlled by a valve 6. The outer wall of the chamber 3 has burner ports 7 extending laterally through it and preferably extending horizontally. These ports 7 are circumferentially spaced around the periphery of the body portion.

The inner wall of the chamber 3 has upwardly inclined ports 8 leading from it and opening into the bore 2. 9 designates a heat radiating and spill-over member spaced from the body portion 1 and secured to it by fastening devices 10 which engage the spacing lugs 11 and provide the passages 12. The member 9 is in the form of an apertured disc having a central opening 13. The inner wall of the chamber 3 flares upwardly and outwardly so that the member 9 overhangs the inner ports 8. The spill-over member, as shown, has its annular marginal portion inclining downwardly and outwardly. The member 9 is of greater diameter than the diameter of the body portion so that it overhangs the outer ports 7. The member 9 therefore, not only serves as a heat radiating plate but also as a spill-over member to direct any food overflowing the cooking utensil from coming into contact with the walls of the ports and clogging or closing such ports. The heat radiating and spill-over member 9 has connected with it a utensil supporting grid 14. This grid 14 is preferably cast integral with the member 9 but it may be made separate and bolted to it. This grid takes the place of the conventional grid which forms the utensil supporting surface of a gas range.

There is a special advantage introducing the fuel tangentially into the chamber of the burner as it provides a more intimate mixing of the fuel and air.

My present invention provides a safe burner as the burner ports cannot be clogged if food overflows the cooking utensil which is being heated.

The member 9 is preferably of cast iron so that it forms an efficient heat radiating member.

It will be apparent that when the outer ports 7 are lighted the fuel from the inner ports 8 will pass through the passages 12 and be ignited.

The inner ports 8 are preferably larger than the outer ports 7 and are preferably spaced further apart than the spacing of the outer ports.

It will now be apparent that I have devised a new and useful gas burner which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent is:—

1. In a gas burner, a body portion having an annular chamber with a tangential fuel inlet and a central unobstructed opening through it, the outer wall of said chamber having circumferentially spaced, laterally extending ports, the inner wall of said chamber diverging upwardly and having circumferentially spaced upwardly inclined ports opening into said central opening, said ports being below the top of the burner, a spill-over disc secured in spaced relation with the top of the burner, having a central opening, and having an imperforate portion overhanging said ports and an utensil supporting grid fixed to said spill-over disc.

2. In a gas burner, a body portion having an annular chamber, a tangential fuel inlet, a central, unobstructed opening, and spacing lugs extending above its top face, the outer wall of said chamber having circumferentially spaced, laterally extending ports, and the inner wall of said chamber having upwardly and inwardly inclined ports opening into said central opening, said ports being below said top face and a spill-over disc secured to said spacing lugs, said disc having a central opening, an imperforate portion overhanging said inclined ports, and having its outer annular marginal portion deflected downwardly and outwardly and overhanging said laterally extending ports.

3. In a gas burner, a body portion having an annular chamber with a fuel inlet and having an unobstructed central opening through the body portion, the outer wall of said chamber having circumferentially spaced laterally extending ports, the inner wall of said chamber diverging upwardly and having circumferentially spaced ports opening into said central opening, said ports being below the top of the burner, a spill-over disc secured in spaced relation with the top of the burner, having a central opening and having an imperforate portion overhanging said ports, and having utensil supporting means.

FRANK H. SCHNEIDER.